UNITED STATES PATENT OFFICE.

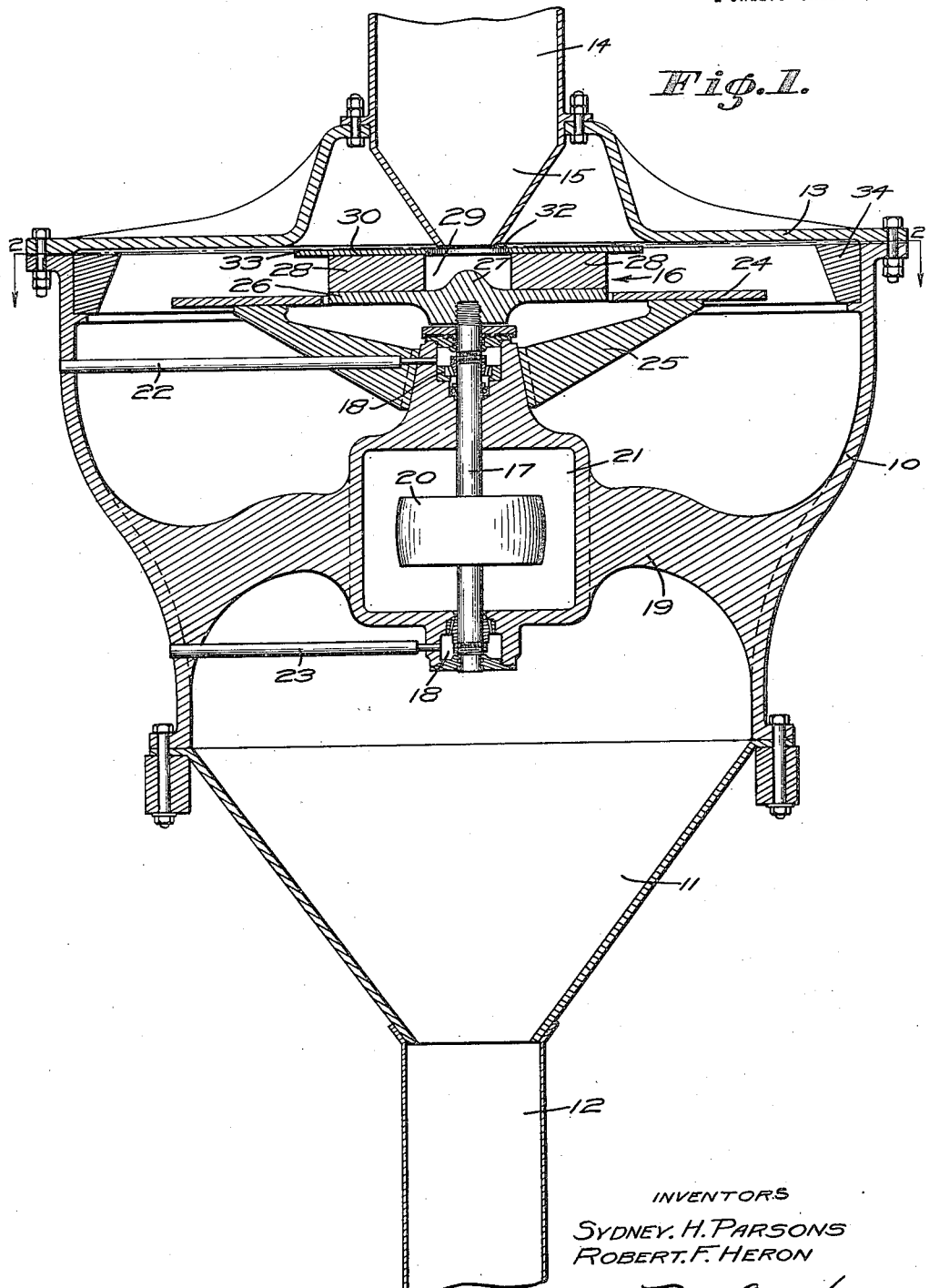

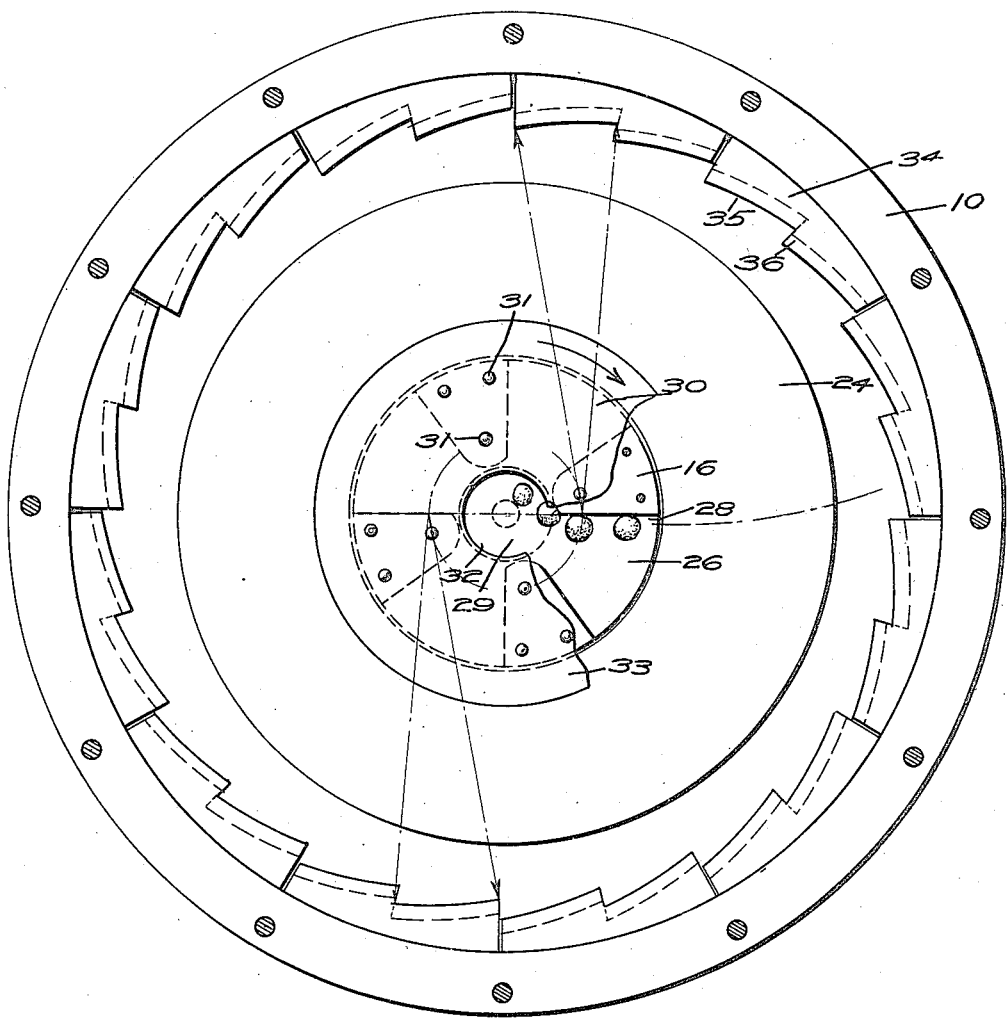
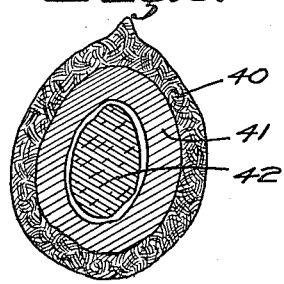

SIDNEY H. PARSONS AND ROBERT F. HERON, OF LOS ANGELES, CALIFORNIA, ASSIGNORS OF ONE-THIRD TO ELLERY P. VERNON, OF LOS ANGELES, CALIFORNIA.

APPARATUS FOR TREATING NUTS.

1,267,110.  Specification of Letters Patent.  Patented May 21, 1918.

Application filed July 22, 1916. Serial No. 110,799.

*To all whom it may concern:*

Be it known that we, SIDNEY H. PARSONS and ROBERT F. HERON, citizens of Great Britain and the United States, respectively, residing at Los Angeles, in the county of Los Angeles and State of California, have invented new and useful Improvements in an Apparatus for Treating Nuts, of which the following is a specification.

Our invention relates to an apparatus for removing the husks from oil nuts and cracking the nuts.

While our apparatus for treating oil nuts is applicable to all kinds of oil nuts, it is especially adapted and designed for treating the cohune palm oil nuts. These oil nuts are indigenous in tropical countries throughout the world, the oil obtained from them is used as a substitute for cocoa nut oil, and is employed in the manufacture of soap. The cohune nut is ovoid in shape and approximately one and three-fourths inches long. It is very much like a cocoanut in its structure, consisting of an outer husk, a solid shell and one kernel inside the shell. The labor of extracting the kernel from the oil nuts is difficult and expensive, by reason of the fact that the hull must first be removed and then the shell, which is exceedingly hard, must be cracked. It requires a very heavy blow with a hammer to crack the shell. Machines are in use in which reciprocating jaws crack the nuts, but these machines require a prior segregation of the nuts as to size. Furthermore the capacity of these machines is rather low.

It is an object of this invention to provide an apparatus whereby the husks of the oil nuts may be easily removed and the shell be cracked without injuring or breaking the kernel within. Our apparatus projects the nuts at proper velocity against a breaker wall, so arranged that the nut will be deflected downwardly away from the path of incidence. When it is desired to crack the nuts, the velocity of the nuts is increased about three times over that required for removing the husks. The great advantage of our apparatus is that the nuts may be cracked without prior sorting as to size and that furthermore, great quantities of nuts may be treated in a short space of time.

The machine comprises a rotary member to which the nuts are fed and from which they are thrown by centrifugal force against a series of breaker plates arranged in such a manner that the nuts will strike them at practically right angles from the path of incidence, and will be deflected in a downward direction toward the outlet of the machine.

With the above and other objects in view, our invention consists in the construction and arrangement of parts of our apparatus as hereinafter described and claimed.

In the accompanying drawings which form a part of this specification, we have illustrated a convenient and practical embodiment of our invention and in which:

Figure 1 is a vertical central section through our apparatus, some parts being shown in elevation for clearness of illustration.

Fig. 2 is a horizontal section taken on line 2—2, Fig. 1.

Fig. 3 is a cross section of a cohune nut to be treated.

Our apparatus consists of a circular tubular housing or frame 10 open at the bottom to which a discharge hopper 11 is attached, from which a discharge chute 12 leads to any convenient place. The top of the frame is closed by a cover plate 13 provided with a central opening for the reception of oil nuts. A feed hopper 14, having a conical bottom 15, leads to a rotor 16.

The rotor 16 is mounted on a vertical shaft 17 whose ends are provided with suitable journal boxes 18, 18, in a spider frame 19, formed integral with the frame 10. Intermediate its end, the shaft 17 is provided with a pulley 20 located in a horizontal belt casing 21 leading outside of the frame 10. Power is transmitted to the pulley 20 through a belt from any suitable source of power, (not shown). Oil ducts 22 and 23 supply lubricants to the upper and lower journal boxes, respectively. An annular stationary guide disk 24 is horizontally disposed in the upper part of the frame 10 and is supported by arms 25 attached to the upper journal box 18.

The rotor 16 comprises a horizontal circular bottom disk 26 provided with a nut distributing knob or boss 27 at its center, immediately beneath the outlet of the hopper 14. Secured to the upper face of the bottom disk 26 are a number of radial guide walls 28 whose inner ends are spaced from the boss 27 forming a nut receiving and distributing chamber 29. A circular horizontal top disk or air plate 30 is rigidly secured by means of rivets 31 to the guide walls 28. The air plate 30 is provided with a central opening 32 which is slightly larger than the outlet of the hopper 14 and positioned immediately beneath said outlet. The air plate 30 is of greater diameter than the bottom disk 26 and forms a horizontal extension flange 33 for a purpose shortly to be described. As clearly shown in Fig. 1, the extension 33 of the air plate 30 extends in close proximity to the cover 13, thereby preventing any parts of the nuts from escaping at the upper end of the housing 10.

At the juncture of the upper end of the frame 10 and the cover 13, we provide a series of breaker walls or plates 34. The same is formed on its interior face of curved surfaces 35 adjoining each other in the form of serrations or teeth 36. The curve is so designed that the material thrown from the periphery of the rotor 16 strikes the breaking plate at, or almost at, right angles to its normal face. The breaking face 35 is inclined away from a circle whose center is the center of the disk 26, with a radius extending to the teeth 36. The breaking face 35 is also inclined away from the vertical toward the walls of the frame 10, as clearly shown in Fig. 1.

In the operation of the machine, the oil nuts are fed through the feed hopper 14 into the receiving and distributing chamber 29 in the rotor 16. The central boss 27 will distribute the nuts into the guide channels formed between guide walls 28 and the upper and lower disks 30 and 26. The nuts fed are thrown out by centrifugal action caused by the revolving of the rotor 16, striking the breaker plate 34. The nuts are guided by the extension 33 of the air plate 30 and the guide ring 24, causing the nuts to travel in as straight a line as possible to the face of said breaking plates. The force of the impact will crack the nut, and by reason of the curved and inclined shape of the breaking plates, the cracked nuts will be deflected downwardly. This deflection is assisted by a draft of air caused by the rotor acting as a fan, forcing the air between the upper housing of the machine and the upper disk or air plate 30, thereby lessening the likelihood of interference of material broken with material later being thrown from the rotor. The breaking plates 34 are disposed at such a distance from the centrifugal member 16 that there is little or no glancing blow struck by the nuts when thrown off the rotor. This distance of the breaking plates from the rotor is so proportioned that the material thrown from the rotor has a larger circular space upon which to impinge thereby lessening the likelihood of interference with material being thrown out by the rotor. The broken material falls into the discharge hopper 11 and out of the discharge chute 12.

We have found that a machine having a diameter of six feet across the top of the frame 10, a speed of 500 revolutions per minute of the rotor will be sufficient to crack and split the husk 40 of a cohune nut illustrated in Fig. 3. After the husks have been removed, the nuts are again fed through the machine which is now speeded up to 1500 revolutions per minute, which will impart a velocity of approximately 9000 feet per minute to the nuts, breaking the hard shell 41, and releasing the kernel 42 of the nut. The feed of the nuts is regulated so that there is one nut for each guide channel in each revolution of the rotor.

We do not confine ourselves to the specific construction of the apparatus as shown and described; as various changes may be made by those skilled in the art, without departing from the spirit of our invention as claimed.

We claim:

1. An apparatus for treating oil nuts, comprising a casing having a feed hopper at the top and an outlet at the bottom, a top cover for said casing, a rotary member within the upper part of said casing, means for rotating the same in a horizontal plane, said rotary member comprising a nut receiving chamber having a nut distributer and radial discharge passages horizontally disposed and affording an uninterrupted path to the nuts, a horizontal air plate forming the top wall of said passages and extending beyond the outer periphery of said rotary member and adjacent to the cover of said casing, a ring shaped stationary guide plate in horizontal alinement with the bottom wall of said passages and a ring shaped breaker wall spaced from said guide plate against which the nuts are thrown, said plate comprising a series of tooth shaped members having tangentially disposed surfaces inclining away from the vertical whereby the nuts thrown against said breaker wall from the rotary member will strike the same at substantially right angles to its normal face and be deflected downwardly toward the lower part of said casing.

2. An apparatus for treating oil nuts comprising a casing, a top cover therefor, a feed hopper mounted on said cover, an outlet at the bottom of said casing, a rotary member within said casing, means for rotating the same in a horizontal plane, said rotary member comprising a nut receiving chamber communicating with said feed hopper and radial discharge passages affording an uninterrupted path to the nuts, a nut distributing member in said chamber, a stationary guide plate in horizontal alinement with the bottom of said passages, a breaker wall spaced from said guide plate against which the nuts are thrown, said plate comprising a series of tooth-shaped members having curved surfaces inclining away from the vertical, said faces constituting transverse sections of hollow cylinders whose axes are arranged in a circle concentric with the center of rotation of said rotary member.

3. An apparatus for treating nuts comprising a casing, a feed hopper at the top and an outlet at the bottom thereof, a rotary member within the upper part of said casing, means for rotating the same in a horizontal plane, said rotary member being provided with a series of radial discharge passages horizontally disposed and affording an uninterrupted path to the nuts and a ring shaped breaker wall spaced from said rotary member against which the nuts are thrown, said wall comprising a series of tooth-shaped members having curved surfaces inclining from the vertical and so designed that the nuts thrown from the periphery of the rotary member strike the breaker wall at substantially right angles to its normal face and deflect the same downwardly toward the lower part of said casing.

4. An apparatus for treating oil nuts comprising a casing, rotary member therein, means for guiding the nuts thrown therefrom in a straight path; means for rotating the same in a horizontal plane, means for feeding the nuts to said rotary member, a breaker wall spaced from said rotary member against which the nuts are thrown, said breaker wall comprising a series of tooth shaped members having tangentially disposed surfaces inclined from the vertical in a downward and outward direction, whereby the nuts thrown from said rotary member will strike the same at substantially right angles to its normal face and will be deflected downwardly toward the lower part of said casing.

5. An apparatus for treating oil nuts comprising a frame, a rotary member mounted therein, means for rotating the same in a horizontal plane, means for feeding the nuts to said rotary member, means for distributing the nuts as they are thrown from said rotary member, means for guiding the nuts in a straight path, and a breaker plate spaced from said rotary member against which the nuts are thrown, said plate having curved surfaces inclined from the vertical in a downward and outward direction, whereby the nuts thrown thereat will strike the same at substantially right angles to its normal face and will be deflected downwardly therefrom.

6. An apparatus for treating oil nuts, comprising a rotary member, means for rotating said member, means for feeding nuts to said member, means for guiding the nuts in a straight path, and a breaker plate spaced from said member, said breaker plate having curved surfaces inclined from the vertical in a downward and outward direction, whereby the nuts thrown thereat will be deflected downwardly therefrom and out of the path of the nuts successively thrown from said rotary member.

7. An apparatus for treating oil nuts comprising a rotary member, means for rotating the same, means for feeding nuts to said member, means for guiding the nuts in a straight path, a breaker plate spaced from said member against which said nuts are thrown, said breaker plate having a curved face inclined to the path in which the nuts are projected whereby the nuts thrown thereat will be deflected out of the path of the succeeding nuts.

In testimony whereof we have signed our names to this specification.

S. H. PARSONS.
ROBERT F. HERON.